Sept. 25, 1962    A. GMEINER ETAL    3,055,665
APPARATUS FOR DISTRIBUTING POURABLE BULK MATERIALS
Filed Aug. 1, 1960    2 Sheets-Sheet 1
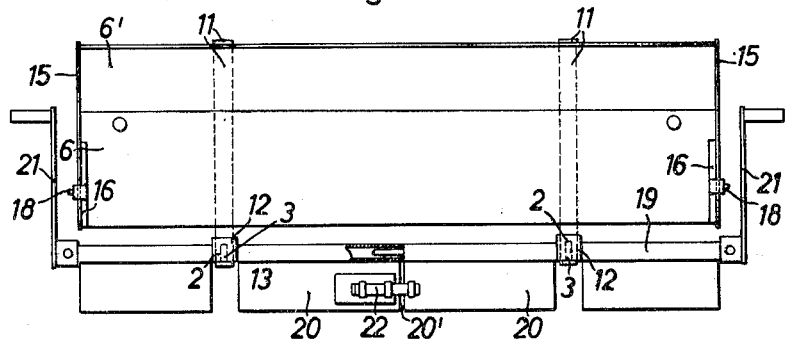
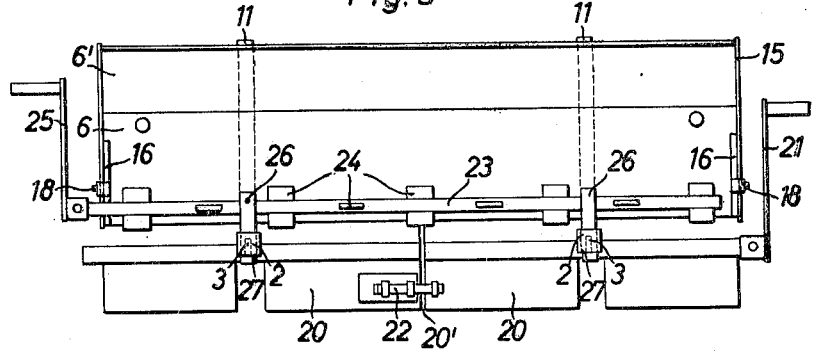
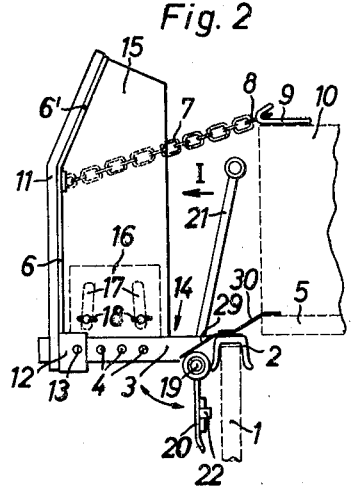
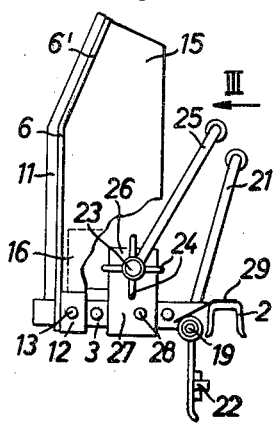

Sept. 25, 1962 A. GMEINER ETAL 3,055,665
APPARATUS FOR DISTRIBUTING POURABLE BULK MATERIALS
Filed Aug. 1, 1960 2 Sheets-Sheet 2

United States Patent Office 3,055,665
Patented Sept. 25, 1962

3,055,665
APPARATUS FOR DISTRIBUTING POURABLE BULK MATERIALS
Ambros Gmeiner, Kleinschwand, near Tannesberg, and Wilhelm Gmeiner, Am Nabburger Tor, Amberg, Germany
Filed Aug. 1, 1960, Ser. No. 46,485
Claims priority, application Germany Aug. 12, 1959
6 Claims. (Cl. 275—8)

Many vehicles for carrying pourable bulk materials such as stones, road surfacing material, gravel, sand and the like having a tippable loading surface, have part of the tailboard hinged above the loading surface, and a distributing shaft below the flow gap formed between the tailboard and loading surface when tipping commences. Such an arrangement is necessarily permanently connected to the vehicle.

According to the present invention apparatus for distributing pourable bulk materials comprises a distributor and projecting supporting bars for the distributor capable of being attached at the open rear end of the loading surface of a load carrying vehicle substantially on a level with the loading surface.

The distributing device can thus easily be attached to and detached from a lorry thus enabling existing lorries to distribute their load substantially evenly as they tip it.

Preferably the supporting bars have a forked head at one end capable of fitting over the top edge of the tailboard when it is in the lowered position. This is a very convenient method of fixing the bars on without many complex links.

The distributor may preferably consist either of a wall mounted on the supporting bars so as to leave a gap between itself and the loading surface, and having detachable chains or rods capable of being fastened to the top of the side walls of the vehicle, or of a star shaft rotatably mounted in bearings mounted on forks on the supporting bars. In the first case the wall is preferably mounted on the supporting bars by forks and in both cases the forks preferably have holes which can be aligned with one of a set of holes in the supporting bars so that the gap between the loading surface and the distributor may be adjusted.

Three examples of the invention will now be described in more detail with reference to the accompanying drawings in which:

FIGURE 1 shows one form of distributor in end elevation in the direction of the arrow 1 in FIGURE 2;

FIGURE 2 is a side elevation of the distributor shown in FIGURE 1;

FIGURE 3 is an end elevation of a similar distributor provided with an agitating shaft;

FIGURE 4 is a side elevation relative to FIGURE 3;

Figure 6:
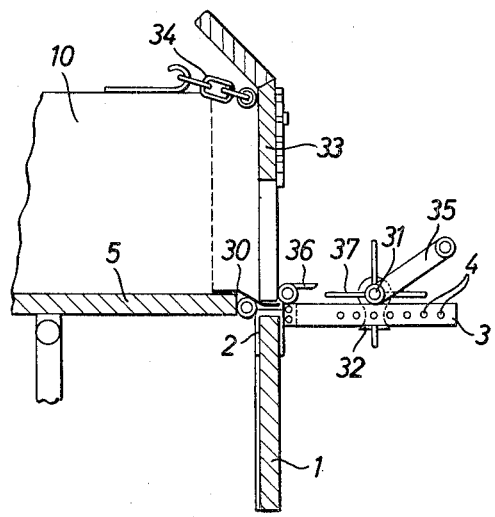
FIGURE 6 is a side elevation relative to FIGURE 5.

Referring now to FIGURES 1 and 2, a pair of supporting bars 3 projecting substantially horizontally to the rear of a vehicle are removably attached to the top edge of the tailboard when in the lowered position by means of forked heads 2. The bars 3 support an intercepting wall 6, forming the distributor and extending over the entire width of the vehicle and bent inwardly at the top at 6', so as to be able to catch and hold back the loaded material slipping off the tippable loading surface 5 of the vehicle. As well as being attached to the bars 3, the intercepting wall is attached by means of a chain 7 and an eye 8 to a hook 9 provided on the side wall 10 of the vehicle.

The intercepting wall 6 is provided with reinforcing ribs 11 in two places, and bearing forks 12 are mounted below these ribs. These forks have holes which can be aligned with one of a series of holes 4 in the bars 3 and fixed in position by insertion pins 13. The flow gap 14 between the intercepting wall 6 and the end wall 1 can thus be varied in size according to the size of the pourable material. The intercepting wall 6 is provided at both sides with side walls 15 to prevent loose material from sliding off to the side. In order to prevent rather fine loose material flowing through at the bottom sides of the side walls 15, they carry downwardly projecting plates 16 the height of which may be adjusted by means of slots 17 and wing nuts 18.

A shaft 19 having flaps 20 is rotatably mounted on the supporting bars 3 near the forked head 2. These flaps can be turned by means of crank handles 21 at the ends of the shaft 19. Movement of these flaps to and fro helps to ensure an even discharge of the loose material. In the example illustrated, two flaps 20 are provided and are divided in the middle at 20'. Each flap 20 is operated by a separate crank handle 21 but the flaps may be locked to one another by means of a bolt 22, so that both can be operated by one crank handle. If it is intended to discharge the loose material over only half the width of the loading surface, one flap 20 can be fixed in the position in which it blocks the flow gap 14.

In FIGURES 3 and 4, an agitating shaft 23 having fins 24 is rotatably mounted on the bars 3 between the flap shaft 19 and the intercepting wall 6. Rotation of this shaft helps to ensure even discharge by breaking up caked material. The agitating shaft also carries a crank handle 25 and moves in bearings 26 provided with downwardly directed forks 27 by means of which they are mounted on the supporting bars 3. The forks 27 have holes 28 which can be aligned with one of the holes 4 of each supporting bar 3 so that the shaft may be fixed to the bars by pins. When an agitating shaft 23 is employed, the shaft 19 only has one handle and the flaps are locked together.

The gap between the downwardly hinged end wall 1 and the shaft 19 can be covered by a fixed slide plate 29 and the space between the loading surface 5 and the end wall 1 can be covered by a plate 30 which is removably attached by means of movable and adjustable pins.

Figure 5:
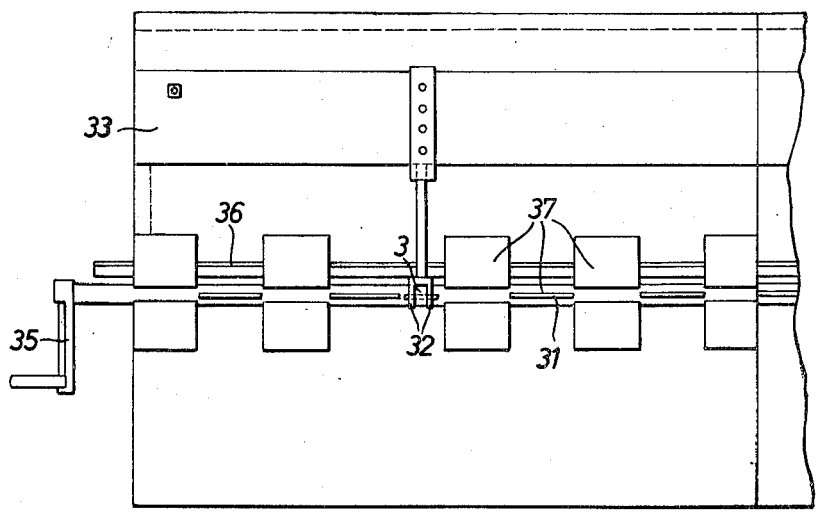
FIGURE 5 is an end elevation of an alternative distributor.

In FIGURES 5 and 6 the distributor takes the form of a star shaft 31 also arranged on the supporting bars 3 so that it can be adjusted and fixed in position on the supporting bars 3 by means of downwardly directed forks 32. Above the star shaft, an intercepting wall 33 is attached to the side walls 10 of the vehicle by means of chains 34 to prevent the loose material slipping off to the rear being able to flow away over the star shaft. As the loose material slides off, the star shaft 31 can be rotated by means of a cranked handle 35, so that the material is substantially evenly distributed. A screening plate 36 mounted on the supporting bars 3 covers the intermediate space between the rear enclosing wall 1 and the vanes 37.

The device is operated in the following manner. On the construction site, the tailboard of the loaded motor vehicle is lowered and the distributing device is placed on the top edge of the lowered tailboard by means of the forked ends 2. The chains 7 are then attached to the side walls 10. Depending on the size of the granular loose material, the gap 14 is then adjusted by moving the intercepting wall 6 forwardly or rearwardly and, if a loose material which tends to pile up, such as sand or gravel, is to be distributed, the agitating shaft 23 is mounted on the supporting bars 3. If the agitating shaft is not used and the loose material is being distributed over the entire width of the load-carrying vehicle, two workmen each move one of the two flaps 20 up and down continuously by means of the hand cranks 21, so that a steady flow is obtained. If the agitating shaft 23 becomes necessary in addition, the two flaps 20 are locked to one another by means of the bolt 22 and one workman moves the two flaps 20 up and down by means of one hand crank 21, and the other workman rotates the agitating shaft by means of the crank 25. If only half the width of the vehicle is required for distribution purposes, one of the flaps 20 is fixed by means of a locking device and only the other flap is moved up and down.

The supporting bars need not necessarily be hooked to the downwardly hinged enclosing wall by means of the forked heads from above, but the forks may also be directed sideways and hooked in under the hinges from the side. Alternatively, if the tailboard opens sideways the supporting bars can be hooked into the open hinge eyes from the side.

What we claim is:

1. A detachable device for distributing pourable bulk materials from a truck body having side and bottom walls and a back opening normally closed by a tail gate that is hingedly mounted at the back edge of the bottom wall and swung downwardly from the latter to a lowered position to permit discharge of the materials through the back opening of the truck body; said device comprising parallel, generally horizontal bars having downwardly opening forks at their forward ends adapted to engage over, and be supported on the upper edge of the tail gate in the lowered position of the latter so as to extend rearwardly from the truck body, an upstanding intercepting wall mounted, at its lower edge, on said bars for adjustment along the latter to define an adjustable gap between said intercepting wall and the back edge of the bottom wall of the truck body through which pourable bulk materials can be discharged downwardly from the truck body, and releasable means for securing the upper portion of said intercepting wall to the side walls of the truck body.

2. A detachable device as in claim 1; wherein said intercepting wall has downwardly opening, perforated forks at its lower edge slidable on said bars for adjustably mounting said intercepting wall on said bars, and said bars each have a series of openings therein and a pin extending through a selected one of said openings and the related apertured fork for locating the latter along said bar.

3. A detachable device as in claim 1; wherein said releasable means includes chains extending from the upper portions of the side edges of said intercepting wall and releasably engageable with hooks adapted to be permanently attached on the side walls of the truck body.

4. A detachable device as in claim 1; further comprising a distributing rotor journalled in bearing brackets slidable on said bars between said intercepting wall and said forks so as to dispose said rotor in said adjustable gap, said brackets having apertures, and each of said bars has a series of openings therein selectively engageable by a locking pin also extending through the aperture of the related bearing bracket for adjustably locating the latter along said bar, whereby the position of said distributing rotor in said gap can be varied.

5. A detachable device as in claim 4; wherein said intercepting wall has downwardly opening, perforated forks at its lower edge slidable on said bars for adjustably mounting said intercepting wall on said bars; and further comprising a pin extending through each perforated fork and a selected one of said openings in the related bar for locating the perforated fork along the latter.

6. A detachable device as in claim 1; further comprising at least one flap member hingedly suspended, at its upper edge, from said bars immediately in back of said forks to swing upwardly and thereby control the rate of flow of pourable bulk material through said gap.

References Cited in the file of this patent

UNITED STATES PATENTS

| | | |
|---|---|---|
| 1,182,747 | Brown | May 9, 1916 |
| 1,928,030 | Putnam | Sept. 26, 1933 |
| 1,994,672 | Smith | Mar. 19, 1935 |
| 2,003,628 | Chadwick | June 4, 1935 |
| 2,005,896 | Hurt | June 25, 1935 |
| 2,059,548 | Broome | Nov. 13, 1936 |
| 2,093,953 | Burchett | Sept. 21, 1937 |
| 2,290,126 | Flink | July 14, 1942 |
| 2,529,889 | Sullivan | Nov. 14, 1950 |
| 2,703,704 | Wylie | Mar. 8, 1955 |
| 2,729,499 | Eggum | Jan. 3, 1956 |
| 2,772,914 | Hansen | Dec. 4, 1956 |
| 2,856,191 | Kolb | Oct. 14, 1958 |
| 2,966,275 | Brookins | Dec. 27, 1960 |
| 2,967,056 | D'Amato | Jan. 3, 1961 |
| 2,997,213 | Richards et al. | Aug. 22, 1961 |